United States Patent
Baierl-Moehler et al.

(10) Patent No.: US 10,133,259 B2
(45) Date of Patent: Nov. 20, 2018

(54) SYSTEM AND METHOD FOR DETECTING SHAPING

(71) Applicant: TRUMPF Werkzeugmaschinen GmbH + Co. KG, Ditzingen (DE)

(72) Inventors: Monika Baierl-Moehler, Nussdorf (DE); Uwe Koehler, Wendlingen (DE)

(73) Assignee: TRUMPF Werkzeugmaschinen GmbH + Co. KG, Ditzingen (DE)

(*) Notice: Subject to any disclaimer, the term of this patent is extended or adjusted under 35 U.S.C. 154(b) by 374 days.

(21) Appl. No.: 14/998,327

(22) Filed: Dec. 24, 2015

(65) Prior Publication Data

US 2016/0124426 A1 May 5, 2016

Related U.S. Application Data

(63) Continuation of application No. PCT/EP2014/001597, filed on Jun. 12, 2014.

(30) Foreign Application Priority Data

Jun. 24, 2013 (DE) .................. 10 2013 211 960

(51) Int. Cl.
*G05B 19/4097* (2006.01)
*G05B 19/4093* (2006.01)
*G06F 17/14* (2006.01)

(52) U.S. Cl.
CPC ... *G05B 19/4097* (2013.01); *G05B 19/40938* (2013.01); *G06F 17/141* (2013.01);
(Continued)

(58) Field of Classification Search
CPC .......... G05B 19/4097; G05B 19/40938; G05B 2219/35194; G05B 2219/36352; G05B 2219/36278; G06F 17/141; Y01P 90/265
See application file for complete search history.

(56) References Cited

U.S. PATENT DOCUMENTS

2005/0228534 A1 10/2005 Shibano
2007/0225847 A1 9/2007 Pietsch et al.

FOREIGN PATENT DOCUMENTS

DE 102009021136 A1 12/2010
DE 102011013044 A1 9/2012
(Continued)

OTHER PUBLICATIONS

Choong et al., "The implementation of an automatic tool selection system for CNC nibbling", Computers in Industry, 23 (3), 1993, pp. 205-222.
(Continued)

*Primary Examiner* — Joseph C Nicely (74) *Attorney, Agent, or Firm* — Fish & Richardson P.C.

(57) ABSTRACT

This disclosure relates to systems and methods for automatically detecting three-dimensional shaping in a three-dimensional model of a sheet-metal part. Therein, data of a three-dimensional model of the sheet-metal part, which extends in a plane spanned by a first direction and a second direction, is detected, wherein the sheet-metal part comprises a bulge in a third direction which is different from the first and the second directions. Then, a horizontal cut is made through the bulge, as well as a vertical cut perpendicular to the plane spanned by the directions, so that closed cross-sectional contours of the bulge are formed. After a transformation, e.g., a Fourier transformation, of the cross-sectional contours, a tool that produces the bulge can be allocated to the Fourier coefficients.

24 Claims, 8 Drawing Sheets

(52) U.S. Cl.
CPC .............. *G05B 2219/35012* (2013.01); *G05B 2219/35194* (2013.01); *G05B 2219/36278* (2013.01); *G05B 2219/36352* (2013.01); *Y02P 90/265* (2015.11)

(56) References Cited

FOREIGN PATENT DOCUMENTS

| | | |
|---|---|---|
| JP | 06292930 A | 10/1994 |
| JP | 07009043 A | 1/1995 |
| JP | 2011-189476 | 9/2011 |

OTHER PUBLICATIONS

Duflou et al., "Automated Tool Selection for Computer-Aided Process Planning in Sheet Metal Bending", CIPR Annals, 54(1), 2005, pp. 451-454.

Duflou et al., "Computer aided process planning for sheet metal bending: A state of the art", Computers in Industry, 56(7), 2005, pp. 747-771.

Etesami et al., "Automatic Dimensional Inspection of Machine Part Cross-Sections Using Fourier Analysis", Computer Vision, Graphics and Image Processing, 20(2), 1985, pp. 216-247.

SYSTEM AND METHOD FOR DETECTING SHAPING

CROSS-REFERENCE TO RELATED APPLICATIONS

This application is a continuation of and claims priority under 35 U.S.C. § 120 to PCT Application No. PCT/EP2014/001597 filed on Jun. 12, 2014, which claims priority to German Application No. DE 102013211960.7, filed on Jun. 24, 2013. The contents of both of these priority applications are hereby incorporated by reference in their entirety.

TECHNICAL FIELD

The invention relates to a system and a method for automatically detecting three-dimensional shaping in a three-dimensional model of a sheet-metal part.

BACKGROUND

Figure 1:
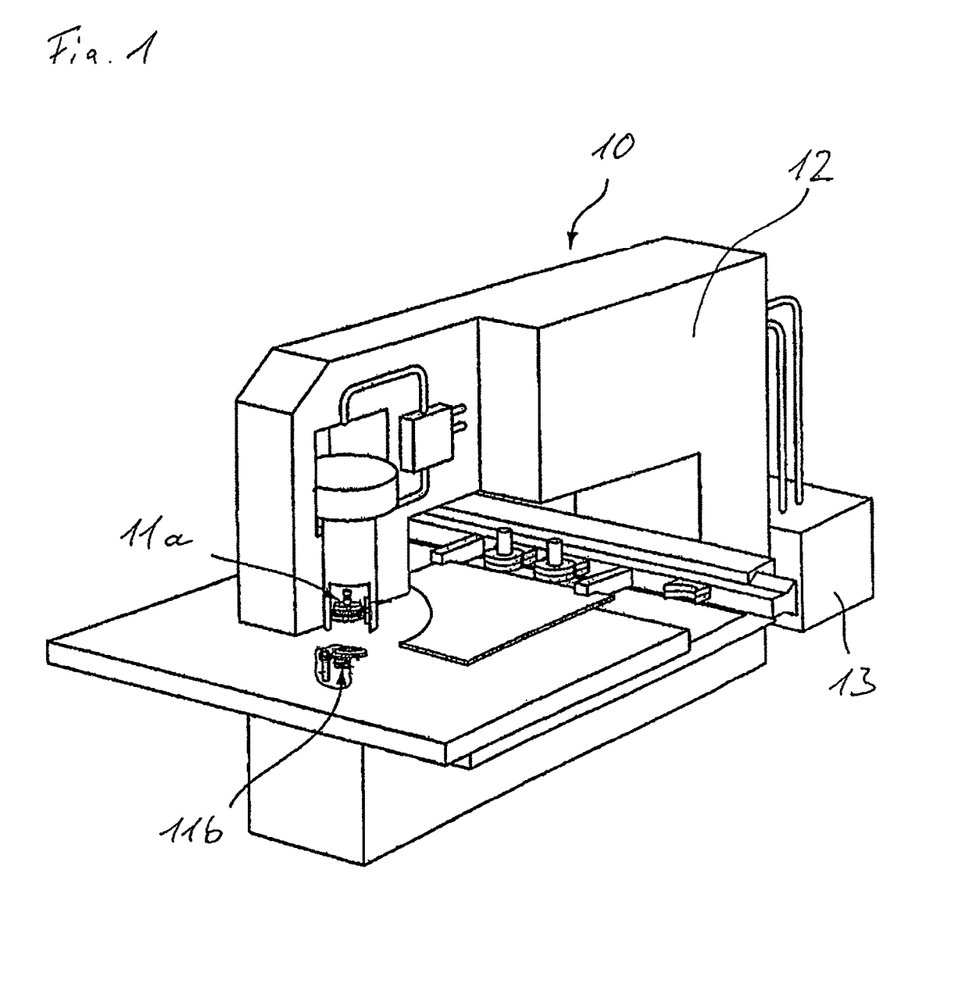
FIG. 1 shows a machine for manufacturing a shaping in a sheet-metal part.

In practice, three-dimensional shaping, for example, bowls or corrugations, can be formed in a sheet-metal part by a machine 10, for example, the machine shown in FIG. 1. Here, the machine 10 comprises a two-part shaping tool 11a and 11b that is housed in a housing 12 of the machine 10. During the three-dimensional shaping, the sheet-metal part (not shown in the figure) is passed through the upper and lower shaping tools 11a and 11b, wherein the shaping tools 11a, 11b engage the sheet-metal part so that a bulge is produced, which forms the shaped part. To be able to use the machine 10 as a Computer Aided Manufacturing (CAM) apparatus in an automatic manner in connection with a CAM method, the machine 10 also includes a processor 13 for automatic control of the required process steps by the individual machine parts on the basis of electronic data.

Figure 2:
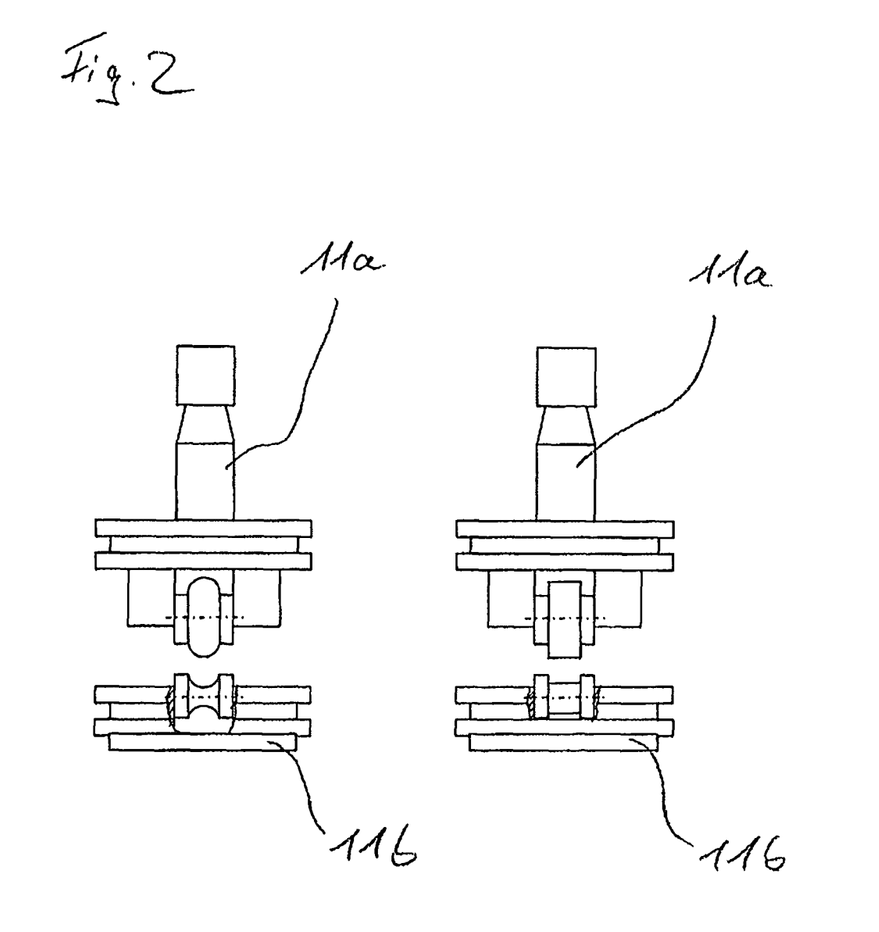
FIG. 2 shows shaping tools applicable in the machine of FIG. 1.

FIG. 2 shows exemplary pairs of shaping tools 11a and 11b that can be used in the machine 10 of FIG. 1.

SUMMARY

An object of the inventions disclosed herein is to provide systems and methods for automatic detection of three-dimensional shape in a three-dimensional model of a sheet-metal part, by means of which an automatic allocation of a tool for producing a shaping can be determined from a three-dimensional model of the sheet-metal part comprising the detected shape. This object can be achieved by the systems and methods described herein. Advantageous developments are indicated herein.

In one aspect, the invention includes systems for the automatic detection of three-dimensional shaping in a three-dimensional model of a sheet-metal part. The systems include an input unit for inputting data of a three-dimensional model of a sheet-metal part that extends in a plane spanned by a first direction (X) and a second direction (Y). The sheet-metal part comprises a bulge in a third direction (Z) perpendicular to a plane spanned by the first direction (X) and the second direction (Y). The systems also include a computing unit configured to generate a first horizontal cut, using the data of the three-dimensional model, through the bulge parallel to the plane spanned by the first direction (X) and the second direction (Y), to obtain at least a first closed two-dimensional horizontal cross-sectional contour of the bulge, and generate a first vertical cut, using the data of the three-dimensional model, through the bulge perpendicular to the plane spanned by the first direction (X) and the second direction (Y) of the sheet-metal part, to obtain a first closed two-dimensional vertical cross-sectional contour of the bulge. The first vertical cut includes a convex partial segment, a first partial cut segment, a concave partial segment, and a second partial cut segment. Each of the first partial cut segment and the second partial cut segment extend between a first side of the sheet-metal part and an opposing second side of the sheet-metal part. The computing unit is configured to apply a transformation to determine one or more transformation coefficients for the first closed two-dimensional horizontal cross-sectional contour and the first closed two-dimensional vertical cross-sectional contour. The systems also include at least one storage unit configured to store an allocation table that allocates tool data to the one or more transformation coefficients. In various embodiments, the tool data can indicate a type of tool. The computing unit can access the storage unit to determine the tool data by the determined transformation coefficients. The systems also include at least one output unit for outputting the data of the three-dimensional model together with tool data In certain embodiments, the transformation is a Fourier transformation and the transformation coefficients are Fourier coefficients. In other embodiments, the Fourier transformation is a discrete Fourier transformation and the Fourier coefficients are discrete Fourier coefficients. In some embodiments, the computing unit is configured to obtain by the first horizontal cut a second closed two-dimensional horizontal cross-sectional contour of the bulge, and subject the first and the second horizontal cross-sectional contour to a transformation to obtain transformation coefficients for the first and the second horizontal cross-sectional contours.

In some embodiments the first partial cut segment and the second partial cut segment extend perpendicular to the plane spanned by the first direction and the second direction. This allows particularly exact reproduction of the type of tool. In some embodiments the first partial cut segment and the second partial cut segment extend at their respective positions in the first direction and the second direction, at which the bulge begins or ends, respectively. In other words, the partial cut segments S2 and S4 directly join the bulge, whereby the outline of the bulge is reproduced in a particularly exact manner, which enhances the reliability of allocation of a corresponding type of tool.

In other embodiments, the computing unit is configured to generate a second vertical cut, which is different from the first vertical cut, to obtain a second closed two-dimensional vertical cross-sectional contour of the bulge, and to determine a Fourier coefficient of the second vertical cross-sectional contour of the bulge. This modification allows obtaining an unambiguous allocation to a type of tool by the second vertical cut, if such an unambiguous allocation was not possible by the first vertical cut. In this case the Fourier coefficient of the first vertical cut can be dropped and only the Fourier coefficient of the second vertical cut can be used for the allocation. Further, an allocation can be made through both or more vertical cuts. In this way, accuracy of the system with respect to tool information can be increased, or different and variable profile depths can be treated as well. As a matter of course, several further vertical cuts can be produced at different locations until an unambiguous allocation of the corresponding Fourier coefficient to a type of tool is possible.

In some embodiments, the system includes a display unit and the computing unit is configured to request manual input of tool data via the display unit if no corresponding tool data is stored in the storage unit for the determined Fourier coefficients. In this way, it is possible to enhance the allocation table and integrate new types of tools.

In some embodiments, the computing unit is configured to produce a two-dimensional model of the sheet-metal part in the plane spanned by the first direction and the second direction from the data of the three-dimensional model of the sheet-metal part and to integrate the determined or input tool data into the two-dimensional model. Thus, a dataset can be generated, which particularly includes all information required for the use in a CAM apparatus in compressed form. This data can directly be applied by the CAM apparatus for controlling a CAM method for automatic manufacturing of a sheet-metal part with corresponding bulge.

In other embodiments, the computing unit is configured to integrate the determined or input tool data as a text module into the two-dimensional model of the sheet-metal part. This modification is particularly suited for visual reproduction of a model of a sheet-metal part with a bulge, since a type of tool may be gathered by a user in a direct optical way. In some embodiments, the input unit is further configured to input tool data for storing in the allocation table of the storing unit. In this way the allocation table can be enhanced or configured to new types of tools in a manual or automatic manner. In other embodiments, the first and the second horizontal cuts are formed at a height in the third direction located between the highest point of the bulge and that side of the sheet-metal part closest to the highest point of the bulge.

Thus, by using the systems described herein, two cuts through the three-dimensional model of the bulge of the sheet-metal part are obtained, which allow an operator to obtain information about the type of tool by means of which the bulge can be generated. The association between the information about the type of tool and the cross-sectional contour obtained through the cuts is effected by a Fourier transformation of the latter ones as well as an allocation of the Fourier coefficients resulting from the transformation, through an allocation table. In this way, tool information can be output via the output unit, which can be used in a CAM process to find the corresponding type of tool. Tool information can be a subset of tool data that helps to identify the tool that can be used to produce the bulge. Tool information can include information about the dimensions of the tool (for example, width and/or radius of the tool). Tool information can be stored in the allocation table where it can be used to form an association between the type of tool to be used and the Fourier transformation of the cross-sectional contour obtained through the cut. Tool data can also include (in addition to tool information) additional data about the tool, for example, height, information about the wear of the tool etc. Once the type of tool to be used is identified, tool data can be loaded from a database (for example, a separate table). Alternately, the entire tool data can be stored in the allocation table.

In this way, the need to manually input the tool data into a CAM apparatus, as required in prior methods and which is time-consuming and work-consuming, can be avoided. Through the use of Fourier coefficients instead of the complete geometric data of the tool in a tool database, searching and finding of corresponding tools is possible at lower technical effort, since a list of coefficients can be browsed faster than a plurality of complex geometrical data of the tool.

In another aspect, the disclosure includes methods for automatic detection of three-dimensional shaping in a three-dimensional model of a sheet-metal part. The methods include detecting data of a three-dimensional model of a sheet-metal part that extends in a plane spanned by a first direction (X) and a second direction (Y). The sheet-metal part comprises a bulge in a third direction (Z) perpendicular to the plane spanned by the first direction and the second direction. The methods also include generating a first horizontal cut, using data of the three-dimensional model, through the bulge parallel to the plane spanned by the first direction and the second direction, to obtain at least a first closed two-dimensional horizontal cross-sectional contour of the bulge. The methods also include generating a first vertical cut, using the data of the three-dimensional model, through the bulge perpendicular to the plane spanned by the first direction and the second direction of the sheet-metal part, to obtain a first closed two-dimensional vertical cross-sectional contour of the bulge. The first vertical cut includes a convex partial segment, a first partial cut segment, a concave partial segment, and a second partial cut segment. Each of the first partial cut segment and the second partial cut segment extend between a first side of the sheet-metal part and an opposing second side of the sheet-metal part. The methods further include applying a transformation to the first horizontal cross-sectional contour and the first vertical cross-sectional contour to determine one or more Fourier coefficients for the first closed two-dimensional horizontal cross-sectional contour and the first closed two-dimensional vertical cross-sectional contour. The methods also include storing an allocation table that allocates tool data to the Fourier coefficients. The tool data indicate a type of tool. The methods further include outputting the data of the three-dimensional model together with the tool data.

In certain embodiments of the methods, the transformation is a Fourier transformation and the transformation coefficients are Fourier coefficients. In other embodiments of the methods, the Fourier transformation is a discrete Fourier transformation and the Fourier coefficients are discrete Fourier coefficients.

In some embodiments of the methods, a second closed two-dimensional horizontal cross-sectional contour of the bulge is obtained by the first horizontal cut, and the transformation is applied to the first and second closed two-dimensional horizontal cross-sectional contours to obtain transformation coefficients for the first and second horizontal cross-sectional contours. In other embodiments of the methods, during the generation of the first and the second vertical cuts, the first partial cut segment and the second partial cut segment extend perpendicular to the plane spanned by the first direction and the second direction. In some embodiments of the methods, during generation of the first and the second vertical cuts, the first partial cut segment and the second partial cut segment extend at their respective positions in the first direction and the second direction, at which the bulge begins or ends, respectively. Some embodiments of the methods include generating a second vertical cut, which differs from the first vertical cut, obtaining a second closed two-dimensional vertical cross-sectional contour of the bulge, and determining one or more Fourier coefficients of the second vertical cross-sectional contour of the bulge. Other embodiments of the methods include requesting a manual input of tool data through the display unit if no corresponding tool data are stored for the determined Fourier coefficients. Some embodiments of the methods include producing from the data of the three-dimensional model of the sheet-metal part a two-dimensional model of the sheet-metal part in the plane spanned by the first direction and the second direction, and integrating the determined or input tool data into the two-dimensional model. Other embodiments of the methods include integrating the determined or input tool data as a text module into the two-dimensional model of the sheet-metal part. Some embodiments of the methods include inputting tool data for storing in the allocation table. In other embodiments of the methods, the first and the second horizontal cuts are made at a height in the third direction located between the highest point of the bulge and that side of the sheet-metal part that is closest to the highest point of the bulge.

The advantages and effects obtained by the methods described herein are the same as those described above in connection with the systems described herein.

In the following, the disclosure of the invention will be described in more detail on the basis of an embodiment with reference to the accompanying drawings.

DETAILED DESCRIPTION

Figure 3:
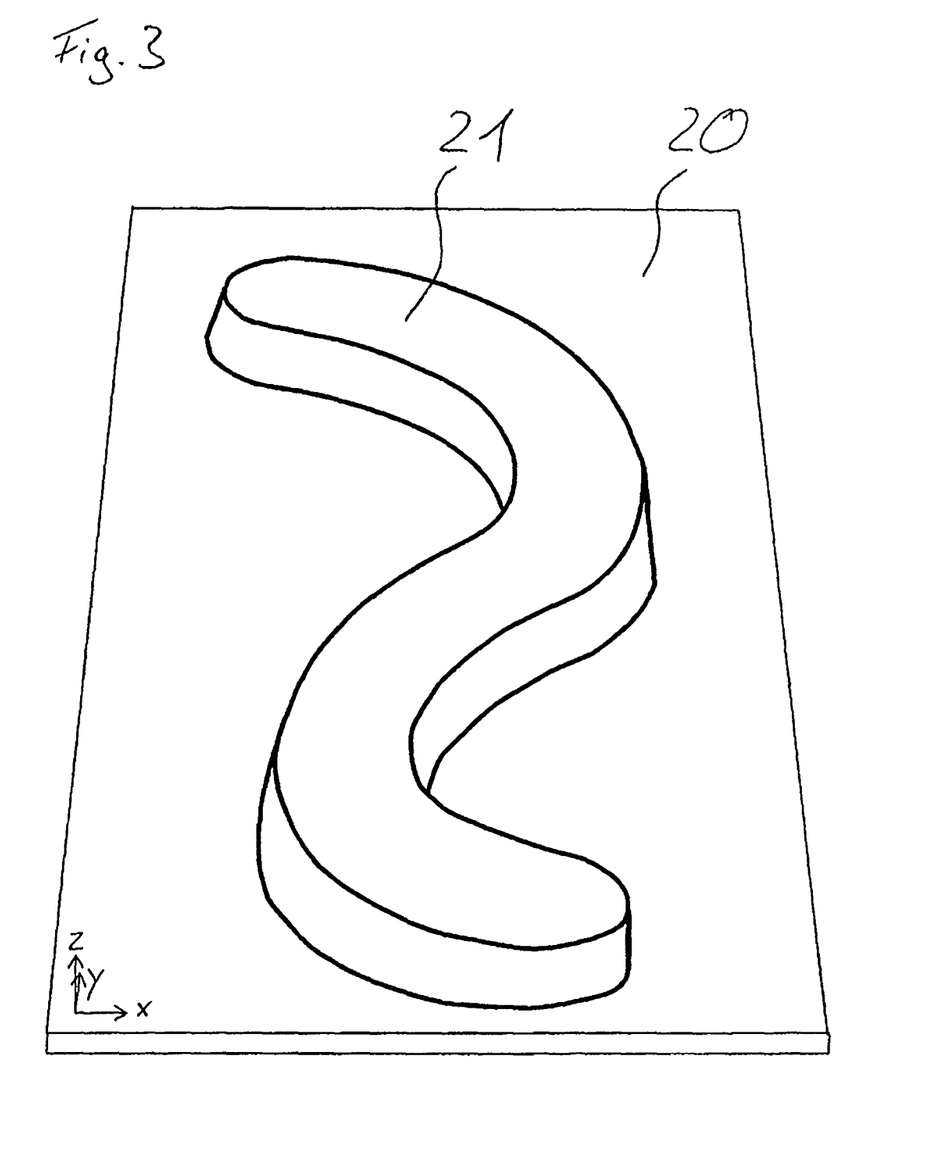
FIG. 3 shows a sheet-metal part with a three-dimensional shape that can be produced by the machine of FIG. 1.

A three-dimensional representation of a sheet-metal part 20 with bulge 21 is shown in the perspective view of FIG. 3. During the manufacturing of such sheet-metal parts, a model must be supplied to a Computer Aided Manufacturing (CAM) apparatus (for example, the machine 10 shown in FIG. 1, or an external computer), that can automatically perform the manufacturing by means of a CAM method. This model is conventionally derived from a three-dimensional model generated by a CAD (Computer Aided Design) method. In this connection, it must be determined which tool shall be used for the production of the three-dimensional shaping. At present, this information is determined by hand and eventually input to the CAM apparatus. This can be time- as well as work-consuming.

Figure 4:
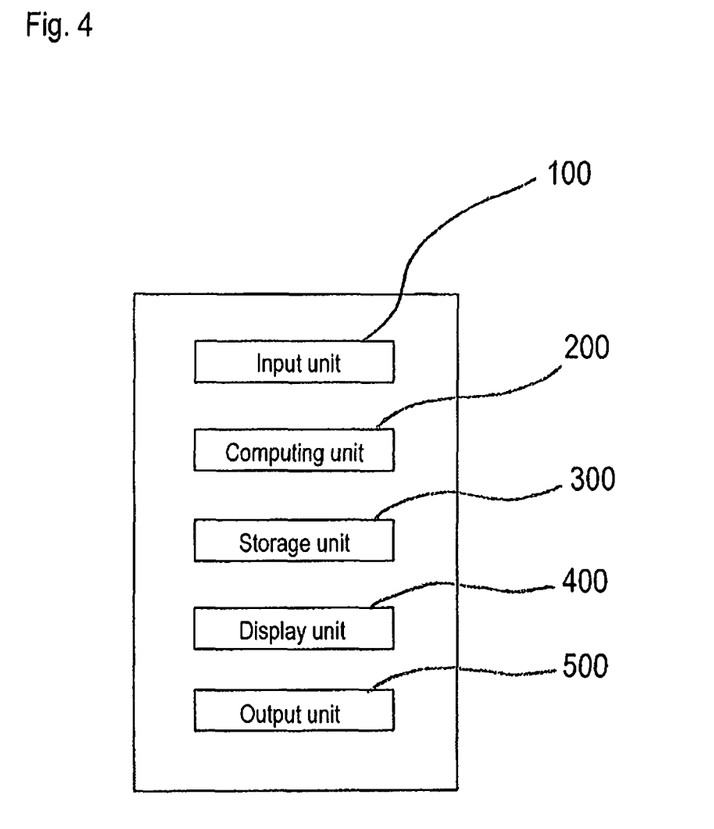
FIG. 4 shows a schematic representation of a system according to an embodiment of the invention.

In FIG. 4, essential elements of a system for automatic detection of three-dimensional shaping in a three-dimensional model of a sheet-metal part are schematically shown. The embodiment illustrated in FIG. 4 comprises an input unit 100 that can serve as an interface for data transmission (for example, a user interface with a mouse and a keyboard) for manual or automatic input of data of a three-dimensional model of a sheet-metal part, a computing unit 200 that can include a processor which is configured to carry out steps necessary for detecting the shaping, a storage unit 300 that can store an allocation table, as well as optionally a display unit 400, e.g., a monitor, for communication with a user, and an output unit 500. The input unit 100, the storage unit 300, the display unit 400, as well as the output unit 500 are functionally connected to the computing unit 200.

Figure 5:
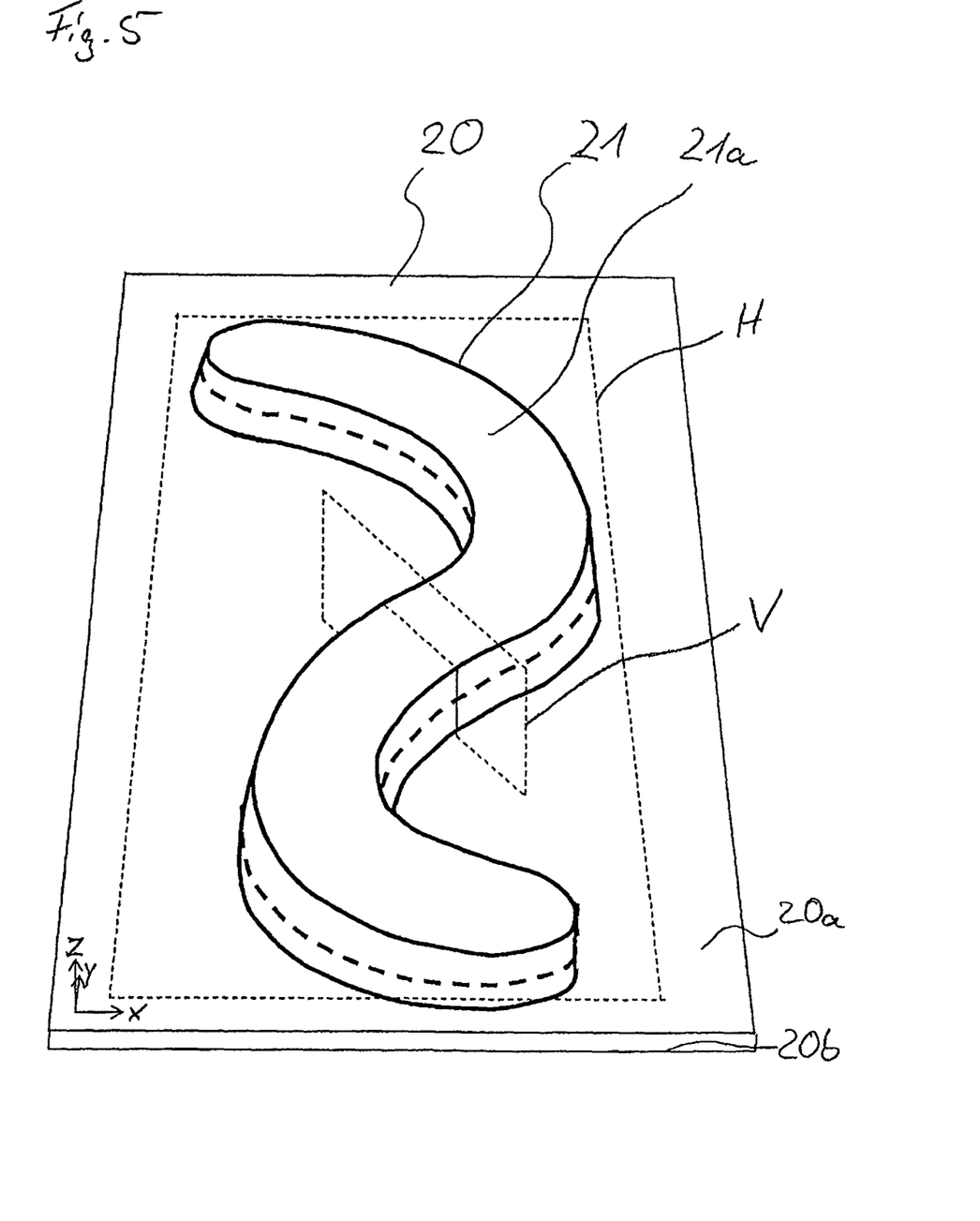
FIG. 5 shows the sheet-metal part with the shape as shown in FIG. 3 with marked cutting planes for a horizontal cut and a vertical cut.

The principle of a method as described herein is explained with reference to FIG. 5, which may be executed, for example, by the system shown in FIG. 4. FIG. 5 shows a perspective view of the three-dimensional model, which can be generated, for example, using a CAD method, from the sheet-metal part 20 with the shaping 21 as shown in FIG. 3. As shown in FIG. 5, the sheet-metal part 20 of the three-dimensional model extends in an XY plane spanned by a first direction X and a second direction Y. The shaping 21 is in the direction Z (perpendicular to X and Y directions), so that the sheet-metal part 20 with the shaping 21 builds a three-dimensional unit.

In FIG. 5, two cutting planes are additionally marked, namely a horizontal cutting plane H parallel to the XY plane spanned by the first direction X and the second direction Y, and a vertical cutting plane V perpendicular to the XY plane. In the course of the method according to the invention, initially, a horizontal cut along the horizontal cutting plane H as well as a vertical cut along the vertical cutting plane V is produced through the three-dimensional model. This can, for example, be done computationally by the computing unit 200 of FIG. 4. The positions of the horizontal cutting plane H and the vertical cutting plane V marked in the figure are only indicated as examples. They can also be applied at other positions of the bulge 21, as long as each of them cuts the bulge 21.

By the horizontal cut and the vertical cut a horizontal and a vertical cross-sectional contour of the bulge 21, respectively, is generated, each of which forms a closed outline in the shown embodiment. The horizontal cut preferably runs between a highest point 21a of the bulge 21 in the Z-direction and the side of the sheet-metal part 20 that is closest to the highest point 21a in the Z-direction. The mentioned side of the sheet-metal part 20 is an upper side 20a, which is defined in the course of the invention in a manner so that it is the side on which the Lower side 20b is arranged opposite upper side 20a. In the present case, the "highest point" 21a is a flat planar area, as can be gathered from FIG. 5, and forms the upper end of the bulge 21. In particular, the horizontal cut can be made so that it runs only slightly below the highest point 21a, that is, only slightly below the upper side of the bulge 21. In connection with the present invention, the term "slightly" is to be interpreted in the sense of a distance of several μm to several mm, for example.

Figure 6:
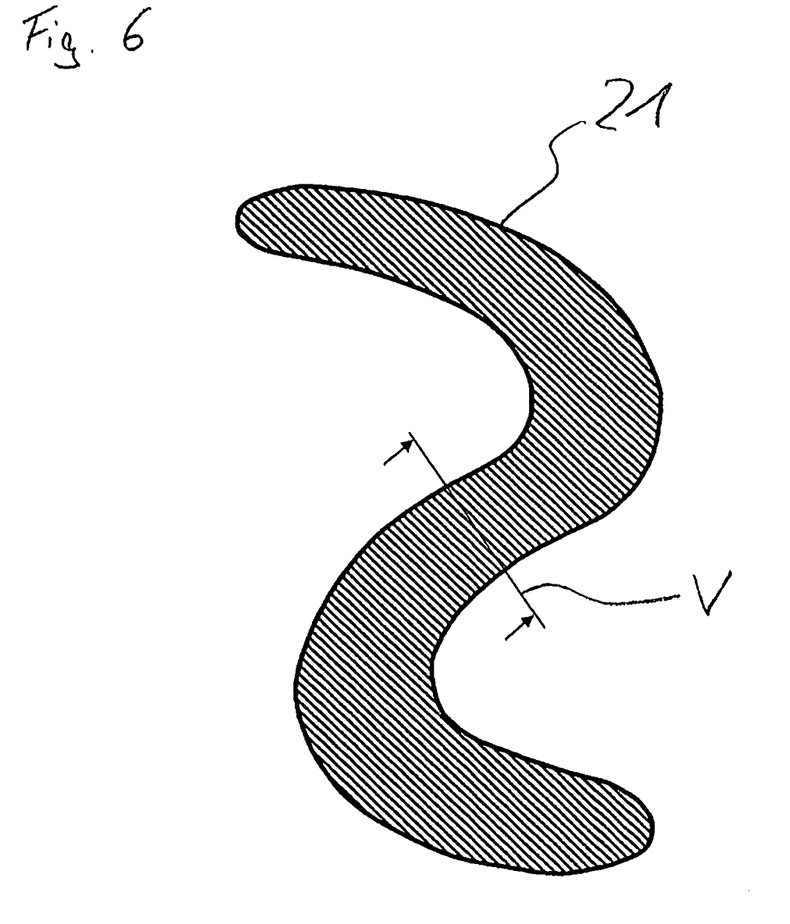
FIG. 6 shows a view of the horizontal cut through the shape in the sheet-metal part of FIG. 5.

The vertical cut can be applied at different cutting positions along the route of the bulge 21, wherein it is preferably oriented perpendicular to the course of the bulge at the cutting position (the course is indicated by arrows in FIG. 6).

FIG. 6 shows a plane view of the closed horizontal cross-sectional contour, which results from the above-described horizontal cut. Since, in the present case, the horizontal cut runs only slightly below the flat planar area 21a of the bulge 21, the area within the shown cross-sectional contour approximately corresponds to the area of the flat planar area 21a, as shown in FIG. 5. The vertical cut is indicated by the line V through the cross-sectional contour of FIG. 6, which leads to the view shown in FIG. 7.

If the bulge does not have a shape with a section, as shown in FIG. 5, e.g., the S-shape with two end points, but a closed shape, a ring for example, the horizontal cut does not result in a closed outline, but in two circular out-lines in this case, namely the outline of the inner circle and the outline of the outer circle of the circular bulge.

Figure 7:
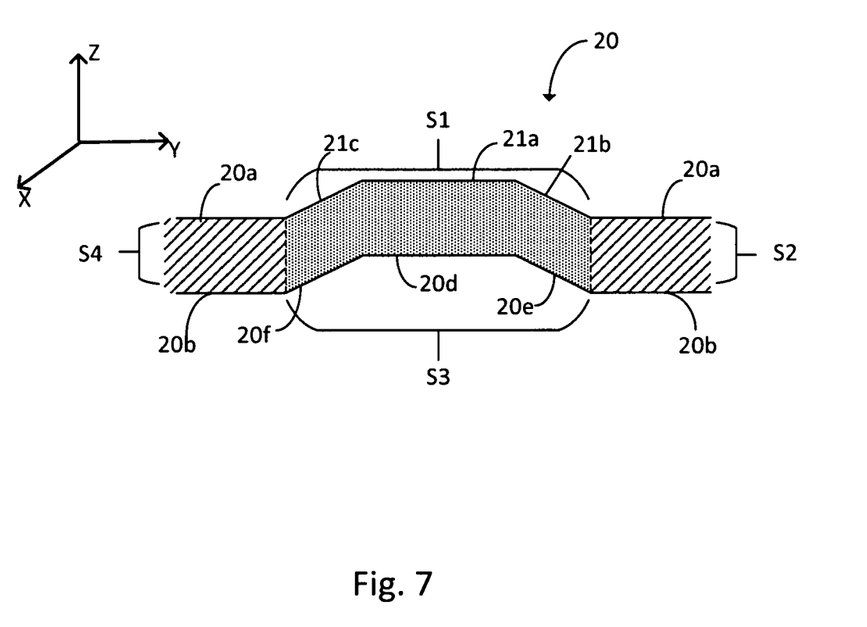
FIG. 7 shows a view of the vertical cut through the shaping in the sheet-metal part of FIG. 6.

As can be seen in FIG. 7, the vertical cut perpendicular to the XY plane includes a closed cross-sectional contour composed of a sequence of several partial sections, namely a convex partial section S1, a first partial cut section S2, a concave partial section S3 and a second partial cut section S4. The convex partial section S1 comprises a first section 21b that is inclined upwards in the Z-direction from the upper side 20a of the sheet-metal part 20, a second section 21a that is a flat planar area that runs parallel to the upper side 20a, and a third section 21c that is inclined downwards until it reaches the upper side 20a. The adjacent partial cut section S2 extends in the Z-direction perpendicular downwards, here, from the upper side 20a to an opposing lower side 20b of the metal-sheet part 20. The concave partial section S3 comprises a first section 20e inclined upwards from the lower side 20b, a second section 20d that is approximately parallel to the upper side 21a, and a third section 20f inclined downwards. The cross-sectional contour is closed by the partial cut section S4 that extends substantially perpendicular to the lower side 20b and the upper side 20a.

Two closed cross-sectional contours can be obtained by the two cuts, each of which represent a closed polygonal line. Such a closed polygonal line can be subjected to a transformation (for example, Fourier transformation), as known, by which coefficients F1, F2 (for example, Fourier coefficients) are obtained, respectively, for each closed polygonal line. Each of the coefficients F1 and F2 can be a single number or a set of several numbers. If a set of several numbers are used, for example, F1 and F2 can each include two, three, or four numbers. For example, the Fourier coefficient F1 can be obtained for the cross-sectional contours obtained from the horizontal cut H, and the Fourier coefficient F2 can be obtained for the cross-sectional contours obtained from the vertical cut V. A skilled person in the field of computer aided construction knows the method of Fourier transformation, for example, from Bronstein, Semendjajev, "Taschenbuch der Mathematik" ("Handbook of Mathematics," B. G. Teubner Verlagsgesellschaft, Verlag Nauka Moskau (Year: 1991, edition 25), so that it does not need to be further discussed here.

These Fourier coefficients F1, F2 can be used to obtain an allocation of the geometry of the bulge 21 to a tool by which the bulge 21 with this geometry can be produced.

If further vertical and horizontal cross-sectional contours are provided, for example two horizontal cross-sectional contours in case of a ring-shaped bulge, an allocation can be formed by calculating Fourier coefficients for each cross-sectional contour.

A corresponding allocation table which associates different Fourier coefficients F1, F2 with corresponding tool data, can be stored in the storage unit 300 shown in FIG. 4. The tool data can then be output through the output unit 500 of FIG. 4 and can be supplied to a CAM apparatus for example, the CAM apparatus shown in FIG. 1.

It is noted that the convex partial section S1 generally corresponds to that partial section which extends between respective positions in the first direction X and in the second direction Y, at which the bulge begins or ends, respectively, above the upper side 20a of the sheet-metal part 20. For example, in FIG. 7, convex partial section S3 comprises sections 21a, 21b and 21c. The concave partial section S3 generally corresponds to that partial section which extends between respective positions in the first direction X and the second direction Y, at which the bulge begins or ends, respectively, above the lower side of the sheet-metal part 20. For example, in FIG. 7, concave partial section S3 comprises sections 21d, 21e, and 21f.

This also leads to the result that different vertical cross-sectional contours are obtained by the vertical cut for different shaped heights. This again results in different Fourier coefficients for the different vertical cross-sectional contour. Due to the remaining similarities of the Fourier coefficients a tool applicable therefore can be concluded, and further processing parameter required therefore, such as penetration depth, can be determined.

Figure 8:
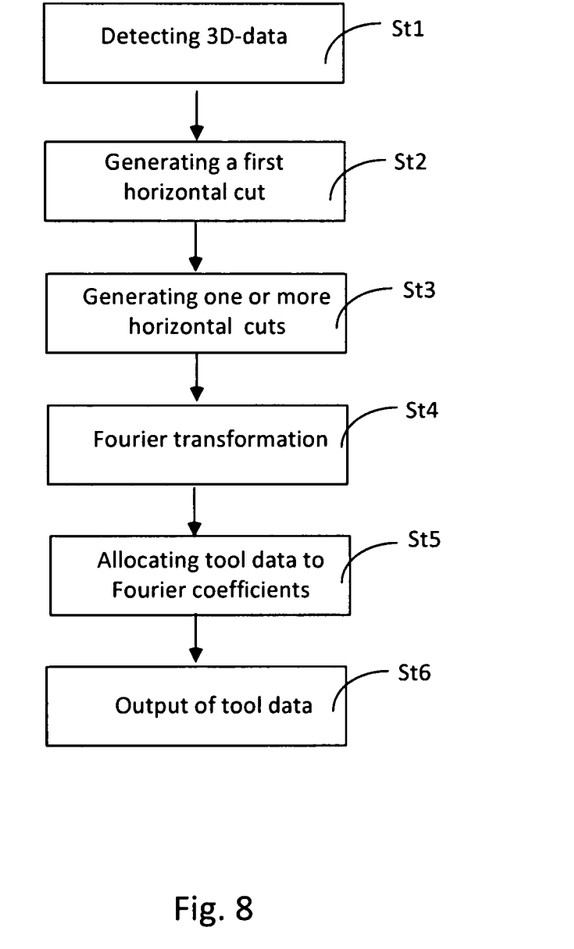
FIG. 8 shows a flow diagram which illustrates the steps of a method according to an embodiment of the invention.

The procedure of an example of a method according to the invention can be gathered from the schematic flow diagram of FIG. 8.

Accordingly, in a first step St1, data of a three-dimensional representation (3D-representation) of a sheet-metal part with three-dimensional shaping is detected. This can be achieved, for example, by generating a three-dimensional model by a user of the system or by transferring such a model to the system according to the invention.

Thereafter, a horizontal cut through the bulge of the model is calculated in a step St2. To achieve this, a plane parallel to a direction X and a direction Y (XY plane) is used to determine their cutting plane of the bulge.

In a step St3 one or more vertical cuts are produced through the bulge (three-dimensional shaping) of the model. Here, a plane perpendicular to the plane spanned by the direction X and the direction Y (XY plane) is used to obtain a cross-section plane of the sheet-metal part. The orientation of the plane is here preferably so that it runs perpendicular to the longitudinal progression of the bulge. To obtain a closed cross-sectional contour of the bulge, the vertical cross-section plane is limited at a position where the sheet-metal part is lifted. Instead, at the position where the bulge for the first time differs in a direction Z from the ground plane of the sheet-metal part, the cross-section plane is limited perpendicular to the sheet-metal of the sheet-metal part.

Thereafter, in a step St4, the closed cross-sectional contours obtained through the horizontal and vertical cuts are subjected to a Fourier transformation, to obtain Fourier coefficients of the horizontal and vertical cross-sectional contours. For a bulge with variable extension in its progression in the direction Z, it may be necessary to calculate two or more vertical cuts and the corresponding Fourier coefficients, so as to determine a tool in an unambiguous manner.

In a next step St5, tool data of a type of tool are allocated to the Fourier coefficients obtained in St4, for example, with the help of a predefined allocation table. Predefined allocation table includes tool data, for example, tool information, that include information about the dimensions of the various tools (for example, width and/or radius of the tools). The tool information in the predefined allocation table can be associated (for example, compared) with the Fourier Coefficients obtained in St4. To achieve this, Fourier coefficients obtained in St4 are searched for in the predefined allocation table so as to read out tool information, e.g., an identification number of the tool, stored in relation to corresponding coefficients. A certain tolerance range (which can be predefined) is allowed in the search of the Fourier coefficient (obtained in St4) in the predefined allocation table. If the Fourier coefficient is not found—within the tolerance range—in the allocation table, the user can be requested to manually input tool data of appropriate tool. In this case, the input tool data can be permanently stored (for example, in the allocation table) and is available for later application cases. The input tool data or the tool data in the predetermined allocation table (for example, tool ID) can be included as a text module in the CAD's sheet-metal part model. This data can be displayed, for example, as symbols, pictures, binary objects, or 3D models of the sheet-metal part.

Finally, in step St6, tool data of the thus determined type of tool is output.

Individual components of the system, for example control components of the computing unit (for example, computing unit 200), may be secured against unauthorized supply of data by use of a dongle, that is, an apparatus that is not replicable and the presence of which is required by the control components for the own operation and which is queried.

Other Embodiments

Modifications of the embodiments described herein are possible within the scope of the claims. The inventions described herein are thus not limited to the described flattened profile of the bulge, but are applicable to any profile. Furthermore, the inventions are not limited to running shaping tools, but can also be applied to punching or stamping tools or others.

In addition, the inventions are not limited to a case where the coefficients for the allocation between the bulge to be formed and the tool are determined by a Fourier transformation. Although this is useful, since the key aspect of the tool can be determined from the Fourier coefficients determined here. The latter is helpful for the positioning of the tool with respect to the workpiece. As an alternative, other transformations, in particular integral transformation such as the Laplace transformation, can be used for determining the coefficients.

The sentential connectives "and," "or," and "either . . . or" are used with a meaning similar to the logic conjunction, the logic adjunction (often "and/or"), or the logic "exclusive or."

A number of embodiments of the invention have been described. Nevertheless, it will be understood that various modifications may be made without departing from the spirit and scope of the invention. Accordingly, other embodiments are within the scope of the following claims.

What is claimed is:

1. A system for automatically detecting three-dimensional shaping in a three-dimensional model of a sheet-metal part, the system comprising:
   (i) an input unit for inputting data of a three-dimensional model of a sheet-metal part that extends in a plane spanned by a first direction and a second direction, wherein the sheet-metal part comprises a bulge in a third direction perpendicular to a plane spanned by the first direction and the second direction;
   (ii) a computing unit configured to
   generate a first horizontal cut, using the data of the three-dimensional model, through the bulge parallel to the plane spanned by the first direction and the second direction, to obtain at least a first closed two-dimensional horizontal cross-sectional contour of the bulge; and
   generate a first vertical cut, using the data of the three-dimensional model, through the bulge perpendicular to the plane spanned by the first direction and the second direction of the sheet-metal part, to obtain a first closed two-dimensional vertical cross-sectional contour of the bulge; wherein
   the first vertical cut comprises:
   a convex partial segment,
   a first partial cut segment,
   a concave partial segment, and
   a second partial cut segment,
   wherein each of the first partial cut segment and the second partial cut segment extend between a first side of the sheet-metal part and an opposing second side of the sheet-metal part, and
   wherein the computing unit is further configured to apply a transformation to determine one or more transformation coefficients for the first closed two-dimensional horizontal cross-sectional contour and the first closed two-dimensional vertical cross-sectional contour;
   (iii) at least one storage unit configured to store an allocation table that allocates tool data to the one or more transformation coefficients, wherein the tool data indicates a type of tool, and wherein the computing unit can access the storage unit to determine the tool data by the determined transformation coefficients;
   (iv) at least one output unit for outputting the data of the three-dimensional model together with tool data; and
   (v) a computer aided manufacturing apparatus configured to receive from the at least one output unit the data of the three-dimensional model together with the tool data for manufacturing the sheet metal part.

2. The system according to claim 1, wherein the transformation is a Fourier transformation and the transformation coefficients are Fourier coefficients.

3. The system according to claim 1, wherein the computing unit is configured to
   obtain by the first horizontal cut a second closed two-dimensional horizontal cross-sectional contour of the bulge; and
   subject the first and the second horizontal cross-sectional contour to a transformation to obtain transformation coefficients for the first and the second horizontal cross-sectional contours.

4. The system according to claim 1, wherein the first partial cut segment and the second partial cut segment extend perpendicular to the plane spanned by the first direction and the second direction.

5. The system according to claim 1, wherein the first partial cut segment and the second partial cut segment extend at their respective positions in the first direction and the second direction, at which the bulge begins or ends, respectively.

6. The system according to claim 1, wherein the computing unit is configured to generate a second vertical cut, which is different from the first vertical cut, to obtain a second closed two-dimensional vertical cross-sectional contour of the bulge, and to determine a Fourier coefficient of the second vertical cross-sectional contour of the bulge.

7. The system according to claim 1, wherein the system comprises a display unit and the computing unit is configured to request manual input of tool data via the display unit if no corresponding tool data is stored in the storage unit for the determined Fourier coefficients.

8. The system according to claim 1, wherein the computing unit is configured to produce a two-dimensional model of the sheet-metal part in the plane spanned by the first direction and the second direction from the data of the three-dimensional model of the sheet-metal part and to integrate the determined or input tool data into the two-dimensional model.

9. The system according to claim 1, wherein the computing unit is configured to integrate the determined or input tool data as a text module into the two-dimensional model of the sheet-metal part.

10. The system according to claim 1, wherein the input unit is further configured to input tool data for storing in the allocation table of the storing unit.

11. The system according to claim 1, wherein the first and the second horizontal cuts are formed at a height in the third direction located between the highest point of the bulge and that side of the sheet-metal part closest to the highest point of the bulge.

12. A method for automatically detecting three-dimensional shaping in a three-dimensional model of a sheet-metal part, the method comprising:
(i) detecting data of a three-dimensional model of a sheet-metal part that extends in a plane spanned by a first direction and a second direction, wherein the sheet-metal part comprises a bulge in a third direction perpendicular to the plane spanned by the first direction and the second direction;
(ii) generating a first horizontal cut, using data of the three-dimensional model, through the bulge parallel to the plane spanned by the first direction and the second direction, to obtain at least a first closed two-dimensional horizontal cross-sectional contour of the bulge;
(iii) generating a first vertical cut, using the data of the three-dimensional model, through the bulge perpendicular to the plane spanned by the first direction and the second direction of the sheet-metal part, to obtain a first closed two-dimensional vertical cross-sectional contour of the bulge;
wherein the first vertical cut comprises:
a convex partial segment,
a first partial cut segment,
a concave partial segment, and
a second partial cut segment,
wherein each of the first partial cut segment and the second partial cut segment extend between a first side of the sheet-metal part and an opposing second side of the sheet-metal part;
(iv) applying a transformation to the first horizontal cross-sectional contour and the first vertical cross-sectional contour to determine one or more Fourier coefficients for the first closed two-dimensional horizontal cross-sectional contour and the first closed two-dimensional vertical cross-sectional contour;
(v) storing an allocation table that allocates tool data to the Fourier coefficients, wherein the tool data indicate a type of tool; and
(vi) outputting the data of the three-dimensional model together with the tool data to a computer aided manufacturing apparatus configured to receive the data of the three-dimensional model together with the tool data for manufacturing the sheet metal part.

13. The method according to claim 12, wherein the transformation is a Fourier transformation and the transformation coefficients are Fourier coefficients.

14. The method according to claim 12, wherein
a second closed two-dimensional horizontal cross-sectional contour of the bulge is obtained by the first horizontal cut, and
the transformation is applied to the first and second closed two-dimensional horizontal cross-sectional contours to obtain transformation coefficients for the first and second horizontal cross-sectional contours.

15. The method according to claim 12, wherein during the generation of the first and the second vertical cuts, the first partial cut segment and the second partial cut segment extend perpendicular to the plane spanned by the first direction and the second direction.

16. The method according to claim 12, wherein during generation of the first and the second vertical cuts, the first partial cut segment and the second partial cut segment extend at their respective positions in the first direction and the second direction, at which the bulge begins or ends, respectively.

17. The method according to claim 12, further comprising:
generating a second vertical cut, which differs from the first vertical cut;
obtaining a second closed two-dimensional vertical cross-sectional contour of the bulge; and
determining one or more Fourier coefficients of the second vertical cross-sectional contour of the bulge.

18. The method according to claim 12, further comprising:
requesting a manual input of tool data through a display unit if no corresponding tool data are stored for the determined Fourier coefficients.

19. The method according to claim 12, further comprising:
producing from the data of the three-dimensional model of the sheet-metal part a two-dimensional model of the sheet-metal part in the plane spanned by the first direction and the second direction; and
integrating the determined or input tool data into the two-dimensional model.

20. The method according to claim 12, further comprising:
integrating the determined or input tool data as a text module into the two-dimensional model of the sheet-metal part.

21. The method according to claim 12, further comprising:
inputting tool data for storing in the allocation table.

22. The method according to claim 12, wherein the first and the second horizontal cuts are made at a height in the third direction located between the highest point of the bulge and that side of the sheet-metal part that is closest to the highest point of the bulge.

23. The system according to claim 2, wherein the Fourier transformation is a discrete Fourier transformation and the Fourier coefficients are discrete Fourier coefficients.

24. The method according to claim 13, wherein the Fourier transformation is a discrete Fourier transformation and the Fourier coefficients are discrete Fourier coefficients.

* * * * *